June 20, 1967     F. L. AUGUSTUS     3,326,243

PIPE PLUG

Filed Jan. 31, 1964

INVENTOR
Frank L. Augustus

By Willard M. Graham
Agent

United States Patent Office 3,326,243
Patented June 20, 1967

3,326,243
PIPE PLUG
Frank L. Augustus, Hawthorne, Calif., assignor to Northrop Corporation, Beverly Hills, Calif., a corporation of California
Filed Jan. 31, 1964, Ser. No. 341,625
3 Claims. (Cl. 138—90)

This invention relates to closure members for pipes and/or conduits and more particularly to a pipe plug adapted to close and render fluid tight the plain end of a pipe or conduit.

Frequently, it becomes desirable, in fact mandatory in many installations, to test pipe systems and the like pressure-wise for reliability, for example—pipe systems installed in pressure vessels, heat exchange equipment, aircraft structures etc. These tests normally are accomplished by subjecting the system to high hydrostatic pressure over an extended period of time. Quite frequently the plain end of a pipe constitutes the only component of a system readily accessible, the foregoing is especially true in aircraft construction.

Briefly the present plug member embodies an internal sealing portion and an external portion including a contractable sleeve member and associated camming means. In the assembled relation of the member on a pipe end, the sleeve member functions to grip the outside of the pipe maintaining the relative position of the member with respect to the pipe and also functions to provide external support for the pipe particularly in cases where the member is used with thin walled conduits or tubing.

Accordingly it is an object of this invention to provide a closure member for the plain end of a pipe adapted to provide an internal seal therefor and incorporating means adapted to grip the pipe externally.

Another object is to provide a closure member adapted to seal the plain end of a pipe requiring no fittings or attachments secured to the pipe.

Another object is to provide a closure member adapted to seal the plain end of a pipe and also to provide external support for the pipe.

Another object is to provide a closure member adapted to seal the plain end of a pipe enabling the pipe to be subjected to higher hydrostatic pressure than those usable with similar devices.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1:
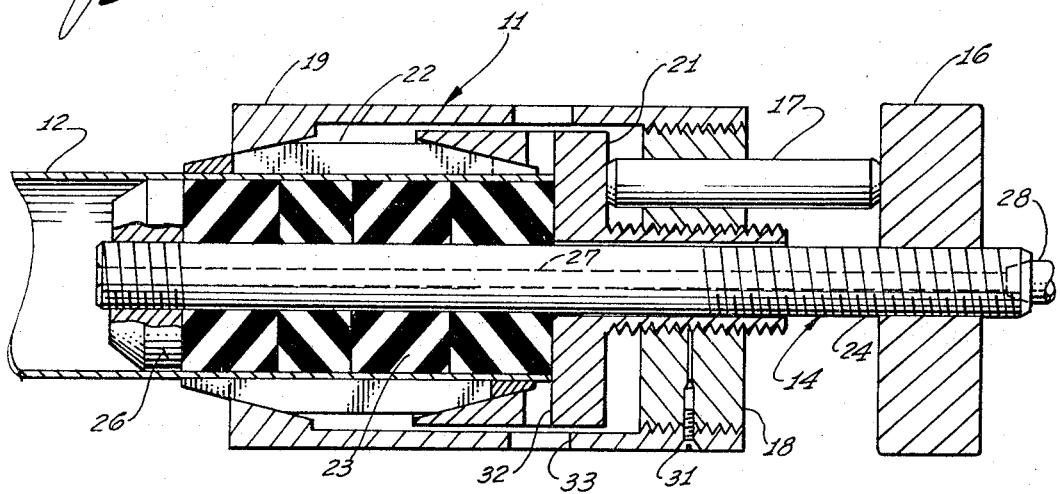
FIGURE 1 is a longitudinal sectional view of the closure member as disclosed herein in its assembled relation on a pipe.
Figure 2:
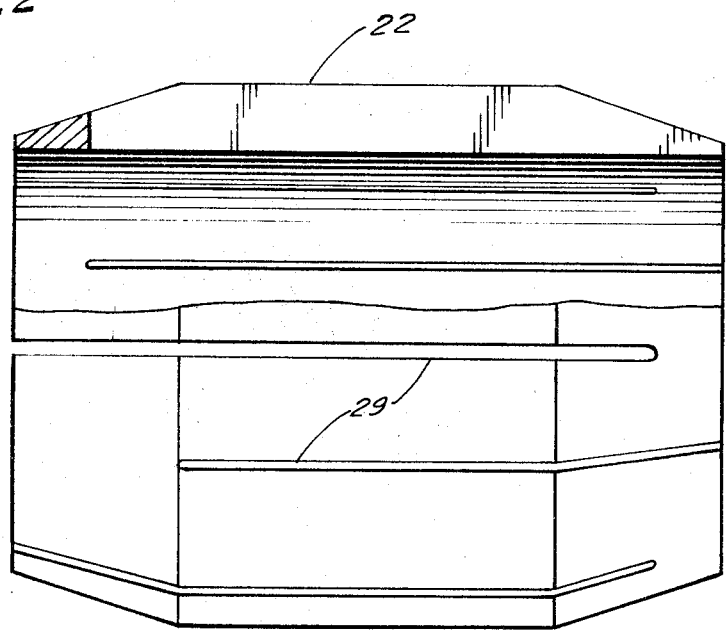
FIGURE 2 is a plan view of the sleeve member (partly in section) comprising a component of the closure member of FIGURE 1.

Referring to the drawing, FIGURE 1 shows a closure member as disclosed herein. The closure member, hereinafter referred to as a pipe plug, is indicated generally by the numeral 11. The plug is shown in its assembled relation on the plain end of a pipe or conduit 12.

The plug 11 includes the following components: a bolt member 14, a nut member 16, pins 17, a bushing member 18, a barrel member 19, a plunger-like member 21, a sleeve member 22, and elastic members 23. The bolt member 14 includes a shank 24 and head 26 and a nut member 16. The shank 24 is provided with a longitudinally extending bore 27 having a tube 28 threadedly secured therein. The tube 28 carries a fitting (not shown) enabling the tube 12 and associated components to be pressurized as presently explained.

The sleeve member 22 is substantially cylindrical and functions similarly as a collet. The outer diameter of its end portions is reduced thereby imparting a frustro-conical configuration to each end. The member 22 also has a plurality of slots 29 formed in the wall portion thereof, the slots extending alternately inboard from opposite ends of the member. The slots impart a degree of compressibility to the member 22 enabling the same to grip the pipe 12 in a manner presently explained.

The members 23 are of disk-like configuration and are fabricated of rubber, neoprene or other suitable elastic material. The elastic members are positioned on the shank 24 adjacent the head 26, likewise the plunger-like member 21 is positioned on the shank 24 in juxtaposed relation with respect to the members 23 and has a sliding relation with respect to the shank 24.

The sleeve member 22 is now positioned in surrounding relation with respect to the conduit 12 with the members 21 and 23 mounted thereon. It will be seen that the sleeve member 22 is received in the frustro-conical end portion of the member 21 substantially as shown in FIGURE 1. The barrel member 19 is now positioned in surrounding relation with respect to the sleeve 22 and bolt member 14. In this position it will be seen that the left end of the barrel member—as viewed in FIGURE 1—mates with the frustro-conical outer end of the sleeve member 22.

The aforementioned relation of the barrel, sleeve and bolt members 19, 22 and 14, respectively, is maintained by means of the bushing member 18, pins 17 and nut 16. The member 18 is first secured to the plunger-like member 21 and then to the barrel member 19 by means of the internal and external threads, respectively, on the member 18. The pins 17 are then positioned in apertures provided in the member 18 and the nut 16 secured in position on the shank 14 by means of threads provided for this purpose. Three equally spaced pins 17 are provided in the member 18.

It will now be apparent that all components comprising the plug 11 are secured together and the latter may be handled as a unit. In this respect, it will be seen that the frustro-conical portions of the barrel and plunger-like members 19 and 21, respectively, mate with the frustro-conical end portions of the sleeve member 22.

In utilizing the plug 11 it is assembled in the manner described above. In this respect no undue force is applied on any of the components of the plug 11 but they are merely tensioned enough to maintain the various components of the plug 11 in their assembled relation.

The head end of the bolt member 14, including the elastic members 23, are now inserted in the end of a pipe or conduit for example—the pipe 12 of FIGURE 1. As the bolt member and elastic members 23 are positioned inside the pipe 12 it will be apparent that the sleeve 22 will encircle the pipe 12. It will be understood that the plug 11 is specifically designed for the pipe it is to be associated with. Accordingly it will be apparent that the elastic members 23 and the sleeve member 22 will have a snug sliding relation with respect to the inside and outside, respectively, of the pipe 12.

A firm (pressure) fit is first established between the sleeve member 22 and the outside of the conduit 12. This is accomplished by imparting rotary movement to the members 18 and 19 relative to the member 21, this movement causing the frustro-conical surfaces defined by the members 19 and 21 to travel in opposite directions or toward each other. Accordingly a camming action is provided by the frustro-conical surfaces defined by the members 19 and 21 causing the sleeve member 22 to contract and provide a firm (pressure) fit therebetween and the outer surface of the conduit 12. The aforementioned rotary movement is easily imparted to the members 18 and 19 by inserting the blade of a screw driver or other pointed object between the pins 17. It will be seen that relative movement between the members 18 and 19 is precluded by screws 31 which pass through the member 19 and are threadably received in the member 18.

Having established a firm (pressure) relation between the sleeve member 22 and the outside of the conduit 12, the nut 16 is now rotated in a first direction. Rotary movement of the nut 16 results in drawing the head of the bolt member toward the nut 16 resulting in axial compression and radial expansion of the members 23. Said member 23 being capable of returning to their normal unstressed position when said nut 16 is rotated in a second direction opposite said first direction. Thus it will be seen that the conduit 12 is supported externally by the sleeve member 22 while the members 23 provide a positive seal internally of the conduit 12. Due to the external support (sleeve member 22) the plug 11 allows the conduit 12 to be subjected to a greater pressure than those capable of being withstood by similar devices. Apertures 32 and 33 are provided in the members 21 and 19, respectively, providing visual means whereby the position of the member 21 relative to the end of the conduit 12 may be checked.

Fluid under pressure may now be admitted to the pipe 12 and associated components through the tube 28 and bore 27 from a pressure source (not shown).

It will also be apparent that with the sleeve member 22 compressed it will provide external support for the pipe 12. The present plug also provides a firm fitting on the pipe 12 while a positive seal is effected internally of the pipe without external permanent fittings of any kind. Also, due to the character of the sleeve member 22 the plug allows the pipe 12 and associated components to be subjected to greater pressure than those capable of being withstood by similar devices.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:
1. A plug member adapted to render fluid tight the end of a pipe or the like comprising:
  (a) a bolt having head and nut members and a shank portion;
  (b) disk-like elastic means mounted on the shank portion of said bolt between said head and nut members;
  (c) a plunger-like member, defining first camming means of frustro-conical configuration, slideably mounted on the shank portion of said bolt between said elastic means and nut members;
  (d) said barrel member, defining second camming means of frustro-conical configuration and being adjustably secured to said plunger-like member so that said barrel member is movable relative to said plunger-like member and having a surrounding relation with respect to the shank portion of said bolt and the end of said pipe and with said first and second camming means being spaced apart and having an opposed relation;
  (e) a sleeve member surrounding the end of said pipe and having end portions of frustro-conical configuration received between said first and second camming means, said end portions being adapted to coact with said first and second camming means for engaging the end of said pipe;
  (f) and a plurality of pin members extending between said nut and plunger-like members which, when said nut member is rotated in a first direction and said plurality of pins abuts said nut and plunger-like members, will allow said head portion to be moved towards said plunger-like member thereby axially compressing and radially expanding said elastic means between said head and plunger-like members and thereby form a fluid tight seal within said pipe, and when said nut member is rotated in a second direction opposite said first direction said head member moves away from said plunger and said elastic means is allowed to return to its unstressed position.

2. Apparatus as set forth in claim 1:
  (a) in which structure securing said barrel and plunger-like members constitutes a bushing member and said plurality of pin members passing through said bushing member in a sliding relation therewith.

3. Apparatus as set forth in claim 2:
  (a) in which said sleeve member has slits formed therein extending alternately from the ends thereof enabling it to be radially compressed as a result of forces applied thereto by said first and second camming means.

References Cited

UNITED STATES PATENTS

| | | | |
|---|---|---|---|
| 1,509,643 | 9/1924 | Frosberg | 138—90 X |
| 2,886,067 | 5/1959 | Maxwell et al. | 138—90 |
| 2,937,666 | 6/1960 | Maisch | 220—24.5 X |

FOREIGN PATENTS 867,188  2/1953  Germany.

LAVERNE D. GEIGER, *Primary Examiner.*

E. J. EARLS, *Assistant Examiner.*